US011934131B2

(12) United States Patent
Tsujibayashi et al.

(10) Patent No.: US 11,934,131 B2
(45) Date of Patent: Mar. 19, 2024

(54) IMAGE FORMING APPARATUS WITH A LASER POWER CORRECTING FEATURE

(71) Applicant: CANON KABUSHIKI KAISHA, Tokyo (JP)

(72) Inventors: Masahiro Tsujibayashi, Chiba (JP); Shinya Suzuki, Chiba (JP); Shohei Okumura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/970,914

(22) Filed: Oct. 21, 2022

(65) Prior Publication Data

US 2023/0128451 A1 Apr. 27, 2023

(30) Foreign Application Priority Data

Oct. 26, 2021 (JP) ................................ 2021-174681

(51) Int. Cl.
*G03G 15/00* (2006.01)
*G03G 15/043* (2006.01)

(52) U.S. Cl.
CPC ....... *G03G 15/5041* (2013.01); *G03G 15/043* (2013.01); *G03G 2215/00042* (2013.01); *G03G 2215/00755* (2013.01)

(58) Field of Classification Search
CPC .................................................... G03G 15/043
See application file for complete search history.

(56) References Cited

U.S. PATENT DOCUMENTS 9,606,469 B2 * 3/2017 Izumi ................. G03G 15/5058
9,996,037 B2 * 6/2018 Kaneko ............. G03G 15/5025

FOREIGN PATENT DOCUMENTS

JP 2000098675 A 4/2000

* cited by examiner

*Primary Examiner* — Leon W Rhodes, Jr.
(74) *Attorney, Agent, or Firm* — ROSSI, KIMMS & McDOWELL LLP

(57) ABSTRACT

An image forming apparatus includes an image forming unit includes a photosensitive member; a charging unit configured to uniformly charge the photosensitive member; an exposure unit configured to form an electrostatic latent image on the photosensitive member by scanning the charged photosensitive member with laser light; and a developing device configured to develop the electrostatic latent image to form an image on the photosensitive member, a reading unit configured to read a test image, which is formed by the image forming unit, for detecting image density of the image, and a controller configured to: control the image forming unit to form the test image; detect periodic fluctuation of the image density based on a detection result of the test image which is acquired by controlling the reading unit to read the test image; and correct an image forming condition to suppress the detected fluctuation.

5 Claims, 10 Drawing Sheets

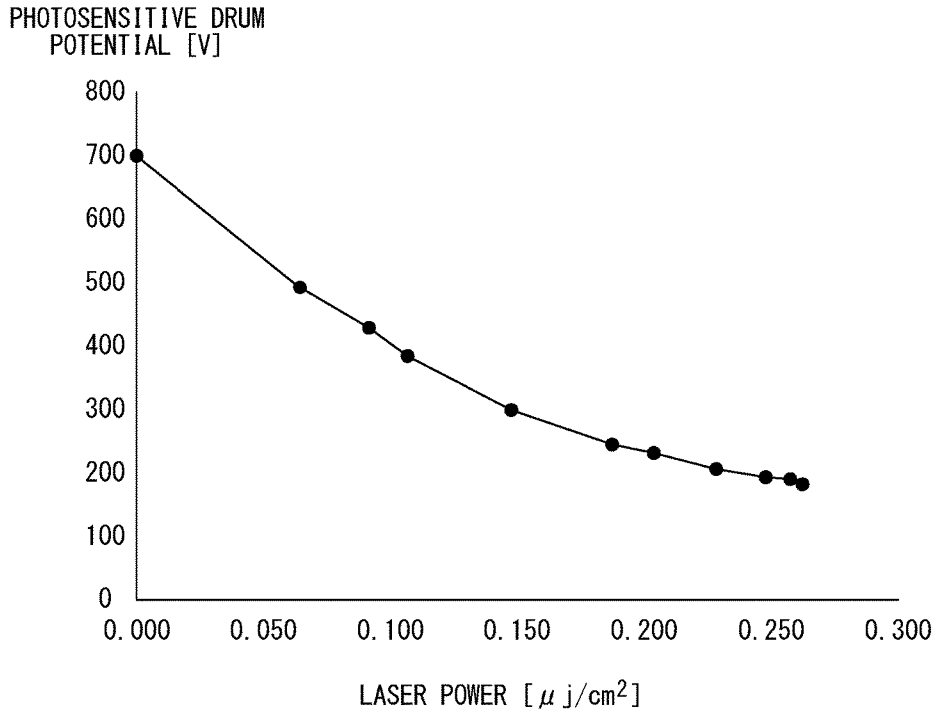

FIG. 12

| | CORRECTION CONDITION | | | ΔD BEFORE CORRECTION | ΔD AFTER CORRECTION | FOGGING CARRIER ADHESION |
|---|---|---|---|---|---|---|
| | CHARGING BIAS | DEVELOPMENT BIAS | LASER | | | |
| (1) | ○ (APPLIED) | ○ (APPLIED) | × (NOT APPLIED) | 0.2 | 0.05 OR LESS | ○ (ACCEPTABLE) |
| (2) | ○ (APPLIED) (WITHOUT THRESHOLD) | ○ (APPLIED) (WITHOUT THRESHOLD) | × (NOT APPLIED) | 0.4 | 0.05 OR LESS | × (UNACCEPTABLE) |
| (3) | ○ (APPLIED) (WITH THRESHOLD) | ○ (APPLIED) (WITH THRESHOLD) | × (NOT APPLIED) | 0.4 | 0.12 | ○ (ACCEPTABLE) |
| (4) | ○ (APPLIED) (WITH THRESHOLD) | ○ (APPLIED) (WITH THRESHOLD) | ○ (APPLIED) | 0.4 | 0.06 | ○ (ACCEPTABLE) |

FIG. 13

IMAGE FORMING APPARATUS WITH A LASER POWER CORRECTING FEATURE

BACKGROUND OF THE INVENTION

Field of the Invention

The present disclosure relates to an image forming apparatus, such as a copying machine, a multifunction apparatus, a printer, or a facsimile machine.

Description of the Related Art

An electrophotographic image forming apparatus is beginning to be widely used in the printing industry, and demands for high speed output and high image quality are rapidly increasing. Among the requirements for the high image quality, uniformity of image density within a page is mostly required. Therefore, it is important to suppress uneven image density within a page. There are various factors that contribute to the uneven image density. It is noted that periodic image density irregularities generated during development are particularly visible. Periodic uneven image density is thought to be caused by periodic fluctuations in intensity of a developing electric field. The periodic uneven image density is caused by rotational unevenness of a rotation of a photosensitive drum or a developing sleeve.

Japanese Patent Application Laid-Open No. 2000-098675 discloses an image forming apparatus which modulates a development bias in accordance with a rotational period of a photosensitive drum to thereby correct the uneven image density caused by the rotational unevenness of the photosensitive drum or the developing sleeve. Specifically, this image forming apparatus uses a rotational position detection sensor for detecting a rotational position of the photosensitive drum and a density detection sensor for detecting image density. The image forming apparatus detects the uneven image density based on the detection result of the density detection sensor. The uneven image density is identified by the rotation period of the photosensitive drum, and is suppressed by periodically changing the development bias using a signal from the rotational position detection sensor as a trigger. The development bias suppresses the uneven image density by canceling electric field fluctuations caused by rotational unevenness and the like to keep the electric field constant. For example, the same effect can be obtained by modulating not only the development bias but also a charging bias when charging the photosensitive drum. Such a technique for correcting the uneven image density caused by rotational unevenness of the photosensitive drum or the developing sleeve is hereinafter referred to as "sub-scanning uneven density correction".

However, in a case where the charging bias or the development bias is modulated to correct the periodic uneven image density which occurs during development, fluctuation in "fog removal potential", which is a difference between a potential of a non-exposed portion of the photosensitive drum and a potential of the developing sleeve, may affect the image to be formed. In general, in a case where the fog removal potential is small, an amount of toner adhered to the non-exposed portion of the photosensitive drum increases, on the other hand, in a case where the fog removal potential is large, an amount of carrier adhered to the non-exposed portion of the photosensitive drum increases. Adherence of the toner to the non-exposed portion of the photosensitive drum reduces image quality as fogging of a white background portion. Further, adherence of the carrier to the non-exposed portion of the photosensitive drum causes image defects in a primary transfer portion and cleaning defects by a drum cleaner. Therefore, the fog removing potential should be set within an appropriate range. However, in a case where the fog removal potential deviates from the appropriate range by modulating the charging bias or the development bias, there is a risk of deterioration in product quality due to the fogging or a risk of failure of the image forming apparatus due to the carrier adhesion.

SUMMARY OF THE INVENTION

An image forming apparatus according to the present disclosure includes an image forming unit having a photosensitive member; a charging unit configured to uniformly charge the photosensitive member; an exposure unit configured to form an electrostatic latent image on the photosensitive member by scanning the charged photosensitive member with laser light; and a developing device configured to develop the electrostatic latent image to form an image on the photosensitive member, a reading unit configured to read a test image, which is formed by the image forming unit, for detecting image density of the image, and a controller configured to: control the image forming unit to form the test image; detect periodic fluctuation of the image density based on a detection result of the test image which is acquired by controlling the reading unit to read the test image; and correct an image forming condition to suppress the detected fluctuation, wherein the controller is configured to: generate, based on the periodic fluctuation of the image density, a correction bias for correcting at least one of a charging bias for charging the photosensitive member by the charging unit and a development bias for development by the developing device; generate, in a case where an amplitude of the correction bias exceeds a predetermined threshold, a laser power correction signal for correcting an amount of the laser light emitted from the exposure unit based on the periodic fluctuation of the image density; control the image forming unit to form an image with the image forming condition in which a driving signal of the exposure unit is corrected under the laser power correction signal.

Further features of the present invention will become apparent from the following description of exemplary embodiments (with reference to the attached drawings).

BRIEF DESCRIPTION OF THE DRAWINGS

FIG. 12 is a diagram representing relationship between laser power and a voltage of a photosensitive drum.

FIG. 13 is a table representing an effect of a first embodiment.

DESCRIPTION OF THE EMBODIMENTS

In the following, at least one preferred embodiment of the present disclosure is described with reference to the attached drawings. The present invention will be described more specifically with embodiments. Although these embodiments are examples of preferred embodiments of the present disclosure, the present disclosure is not limited only to the configurations of these embodiments.

First Embodiment

Figure 1:
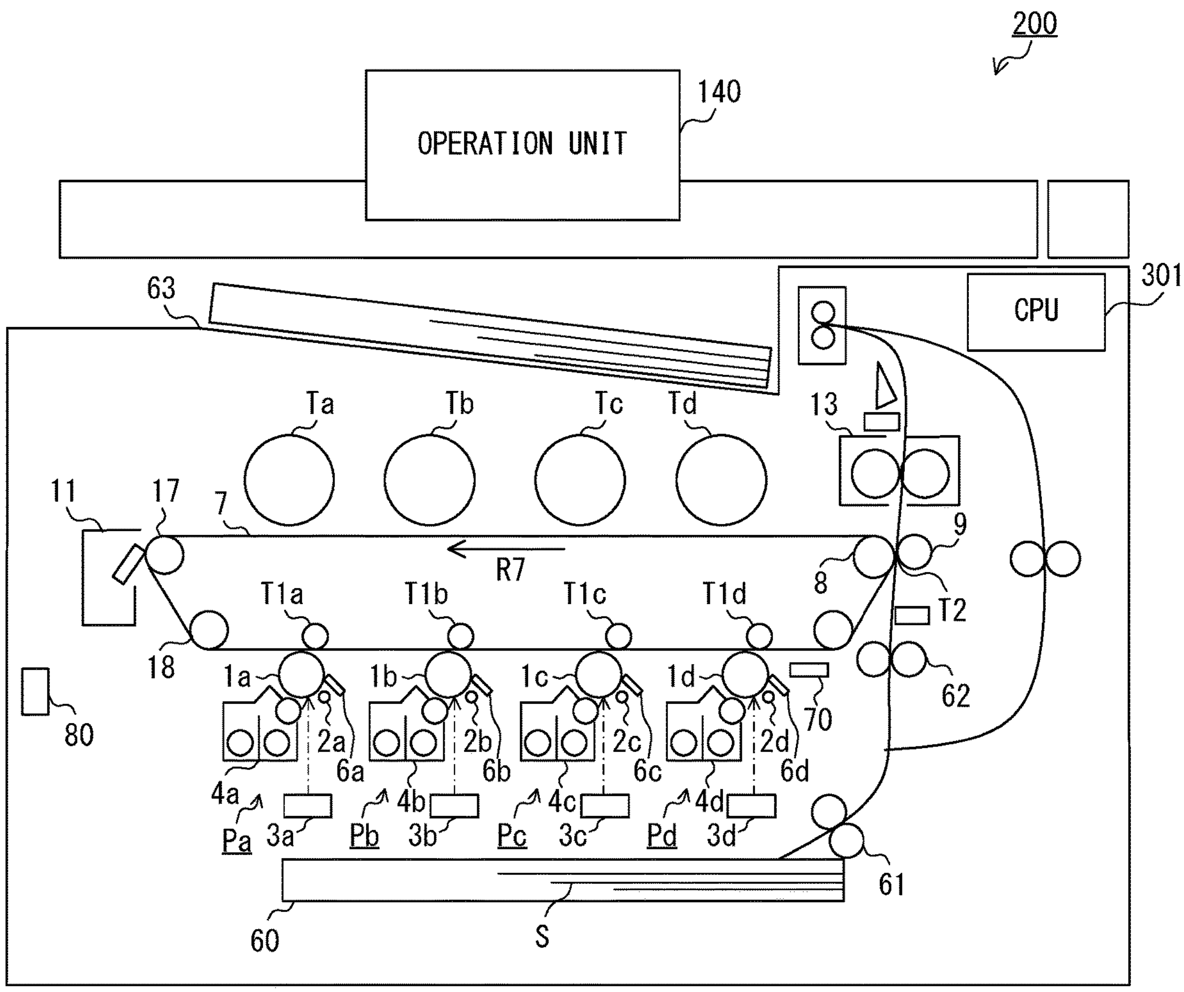
FIG. 1 is a configuration diagram of an image forming apparatus.

FIG. 1 is a configuration diagram of an image forming apparatus according to a first embodiment of the present disclosure. An image forming apparatus 200 of the present disclosure is a four-color full color printer using an electrophotographic system. The image forming apparatus 200 shown in FIG. 1 may be appropriately combined with other apparatuses to configure a copier, a multifunction apparatus, or a facsimile.

The image forming apparatus 200 forms an image on a sheet-like printing material based on a print signal acquired from an external apparatus. The printing material is a recording medium on which an image can be formed, for example, the printing material is a regular paper, a coated paper, OHT, a label and the like. Hereinafter, the printing material is referred to as "sheet S." The image forming apparatus 200 converts the acquired print signal into an image signal in which colors are separated into four colors of yellow (Y), magenta (M), cyan (C), and black (K). The image forming apparatus 200 charges a plurality of photosensitive members corresponding to each color to a predetermined potential, and exposes the charged photosensitive members based on the image signals of respective colors to form electrostatic latent images corresponding to the respective photosensitive members. The image forming apparatus 200 develops the electrostatic latent images with toners of corresponding colors to form a toner image on each photosensitive member, and superimposes and transfers the toner image onto an intermediate transfer member from each photosensitive member. The image forming apparatus 200 collectively transfers the toner images from the intermediate transfer member onto the sheet S. The image forming apparatus 200 performs a fixing process by thermocompression to the sheet S onto which the toner image has been transferred, and discharges the sheet S as a product.

Image forming apparatus 200 has an operation unit 140. The operation unit 140 is a user interface, and includes, for example, a display, operation buttons, a touch panel, and the like. A user can input various processing instructions to the image forming apparatus 200 through the operation unit 140. For example, the user can input an image formation instruction or an instruction to perform a sub-scanning uneven density correction, which will be described later, through the operation unit 140.

In order to perform the image forming process as described above, the image forming apparatus 200 has image forming units Pa to Pd, an intermediate transfer belt 7 as the intermediate transfer member, and a fixing device 13. The image forming apparatus 200 employs a tandem intermediate transfer system in which the image forming units Pa to Pd are arranged along the intermediate transfer belt 7. The intermediate transfer belt 7 is an endless belt tensioned by a plurality of rollers including a drive roller 18, a tension roller 17, and a secondary transfer inner roller 8, and is conveyed (rotated) in a direction of R7. Each of the image forming units Pa to Pd forms a different color toner image. In the first embodiment, an image forming unit Pa forms a toner image of yellow (Y). The image forming unit Pb forms a toner image of magenta (M). The image forming unit Pc forms a toner image of cyan (C). The image forming unit Pd forms a toner image of black (K).

The image forming units Pa to Pd differ only in the color to be used, and perform the same operation with the same configuration. In the following, the image forming unit Pa for forming a yellow toner image will be described, and the description of the image forming units Pb to Pd will be omitted. In the following description, when it is not necessary to distinguish the colors, a, b, c, and d at the end of the reference numerals are omitted.

The image forming unit Pa has a configuration in which a charger 2*a*, an exposure device 3*a*, a developing device 4*a*, a primary transfer unit T1*a*, and a drum cleaner 6*a* are arranged around a photosensitive drum 1*a*, which is a photosensitive member.

The photosensitive drum 1*a* has a photosensitive layer formed on a grounded cylindrical conductor tube, and is driven to rotate clockwise in the figure about its drum shaft. The charger 2*a* is in a form of a roller in which an elastic layer is formed around a conductive central axis. The charger 2*a* is driven to rotate while forming a nip portion between the charger 2*a* and the photosensitive drum 1*a* by being urged toward the photosensitive drum 1*a*. At this time, the charger 2*a* uniformly charges a surface (photosensitive layer) of the photosensitive drum 1*a* to a predetermined potential by applying a charging bias to a central axis from a charging high-voltage power supply.

The exposure device 3*a* is a laser scanner which scans and exposes a laser beam emitted from a laser light emitting element in an axial direction of the photosensitive drum 1*a* via a polygon mirror and an fθ optical system. The laser beam modulated by the driving signal generated based on the image signal is irradiated onto the photosensitive drum 1*a*. As a result, a potential drop occurs in the portion of the surface of the photosensitive drum 1*a* that is exposed to the laser beam, and an electrostatic latent image corresponding to the image signal is formed on the surface of the photosensitive drum 1*a*.

The developing device 4*a* includes an agitating/conveying unit filled with a two-component developer including a magnetic carrier and a non-magnetic toner, a developing sleeve, and a regulating member arranged with a predetermined gap from the developing sleeve. The developing sleeve is configured by providing a conductive member around a magnet roller which is fixedly arranged. The developer is agitated and conveyed in the agitating/conveying unit, thus the toner is charged with a predetermined charge. The charged developer is carried and conveyed on the developing sleeve by the magnetic force of the magnet roller and the rotation of the developing sleeve, and is adjusted to a predetermined thickness by the regulating member. The developer adjusted to a predetermined thickness on a developing sleeve is supplied to the photosensitive drum 1*a*.

The developer is supplied to the photosensitive drum 1*a* by applying a development bias to the developing sleeve from a developing high voltage power supply. By applying the development bias to the developing sleeve, the toner is moved from the developing sleeve to the photosensitive drum 1*a* due to the driving force generated by a potential difference between the electrostatic latent image formed on the photosensitive drum 1*a* and the development bias. The toner moved to the photosensitive drum 1*a* adheres to the electrostatic latent image and develops the electrostatic latent image as a toner image. It is noted that toner polarity is negative in the first embodiment.

The primary transfer unit T1*a* includes a primary transfer roller at a position facing the photosensitive drum 1*a* with the intermediate transfer belt 7 interposed therebetween. A primary transfer nip is formed by urging the primary transfer roller toward the photosensitive drum 1*a*. The toner image on the photosensitive drum 1*a* is transferred onto the intermediate transfer belt 7 by applying a primary transfer bias having a polarity opposite to that of the toner to the primary transfer roller. At this time, the toner that remains on the photosensitive drum 1*a* without being transferred is collected by the drum cleaner 6*a*. The photosensitive drum 1*a* from which the toner that remains on the photosensitive drum 1*a* has been collected by the drum cleaner 6*a* is used again for image forming.

The image forming units Pb to Pd form toner images of corresponding colors on the photosensitive drums 1*b* to 1*d* by the same processing as the image forming unit Pa. A toner image of magenta is formed on the photosensitive drum 1*b*. A toner image of cyan is formed on the photosensitive drum 1*c*. A toner image of black is formed on the photosensitive drum 1*d*. The intermediate transfer belt 7 is rotationally driven at a surface speed substantially equal to that of the photosensitive drums 1*a* to 1*d*. The toner images of respective colors formed by the image forming units Pa to Pd are superimposed and transferred on the intermediate transfer belt 7 in accordance with the rotational speed of the intermediate transfer belt 7 to align their positions.

For feeding the sheet S on which an image is to be formed, the image forming apparatus 200 has a sheet feeding cassette 60, a sheet feeding roller pair 61, a registration roller pair 62, and a secondary transfer outer roller 9 in a conveyance path along which the sheet S is to be transported. The secondary transfer outer roller 9 and the secondary transfer inner roller 8 form a secondary transfer unit T2. The sheet feeding cassette 60 stacks and stores the sheet S therein. The sheet S is frictionally separated by the sheet feeding roller pair 61 in accordance with a timing of image forming by the image forming units Pa to Pd, and fed and conveyed to the conveyance path sheet by sheet. Sheet S is conveyed to the registration roller pair 62 via the conveyance path. After a skew correction of the sheet S, the registration roller pair 62 adjusts the timing and conveys the sheet S to the secondary transfer unit T2.

At the secondary transfer unit T2, the secondary transfer outer roller 9 is driven to rotate while forming a secondary transfer nip by being urged toward the secondary transfer inner roller 8 with the intermediate transfer belt 7 interposed therebetween. The sheet S, which is supplied to the secondary transfer unit T2, is nipped and conveyed in the secondary transfer nip. At this time, the toner image on the intermediate transfer belt 7 is transferred onto the sheet S by applying a secondary transfer bias having a polarity opposite to that of the toner to the secondary transfer outer roller 9. The toner remaining on the intermediate transfer belt 7 without being transferred is collected by a belt cleaner 11 arranged to face the tension roller 17 with the intermediate transfer belt 7 interposed therebetween. The intermediate transfer belt 7 from which the toner that remains on the intermediate transfer belt 7 has been collected by the belt cleaner 11 is used again for image forming.

The fixing device 13 has a roller pair in which a heater is installed, and melts and fixes the toner image on the sheet S by thermocompression. When the toner image is fixed on the sheet S, the product is completed. The product is discharged onto a paper discharge tray 63 provided outside the image forming apparatus 200.

<Development Gamma Characteristics, Vback Latitude>

Figure 2:
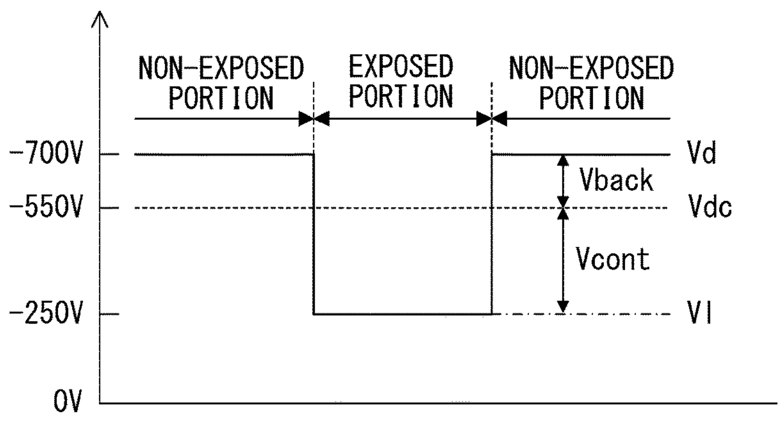
FIG. 2 is an explanatory diagram representing relationship between a voltage of a photosensitive drum and a development bias in a developing portion.

FIG. 2 is an explanatory diagram of relationship between a potential of the photosensitive drum 1 and the development bias in a developing portion in a case where the sub-scanning uneven density correction is not performed. As described above, the photosensitive drum 1 is scanned in the axial direction of the drum by the laser beam. Therefore, the axial direction of the drum is a main scanning direction. A sub-scanning direction orthogonal to the main scanning direction is a rotation direction of the photosensitive drum 1. Since the laser beam does not expose all range of the drum axial direction of the photosensitive drum 1, there are an exposed portion where the laser beam is exposed and a non-exposed portion where the laser beam is not exposed.

A potential of the non-exposed portion of the photosensitive drum 1 is Vd, and a potential of the exposed portion is Vl. A direct current component of the development bias applied to the developing sleeve is Vdc. The potential Vd of the non-exposed portion is a potential charged by the charger 2. The potential Vl of the exposed portion is a potential obtained by changing the potential charged by the charger 2 by exposure of the laser light. In the first embodiment, as to the development bias, an alternating current component is superimposed on the above direct current component in order to improve developability. As the AC component, for example, an AC voltage having a frequency of 1.4 kHz and a peak-to-peak voltage of 1 kVpp is used.

The magnetic carrier of a two-component developer of the first embodiment is configured by coating a silicon resin on a ferrite-base core. The magnetic carrier has a volume resistivity of about $10^{13}$SΩ*cm and a particle size (volume average particle size) of about 40 μm. The non-magnetic toner is a powder having a volume-average particle diameter of about 61 μm, which is configured by dispersing a coloring agent and a charge control agent, and the like in polyester-based resin. The non-magnetic toner is frictionally charged to negative polarity by sliding against a magnetic carrier. On the other hand, the magnetic carrier is frictionally charged to positive polarity.

Figure 3:
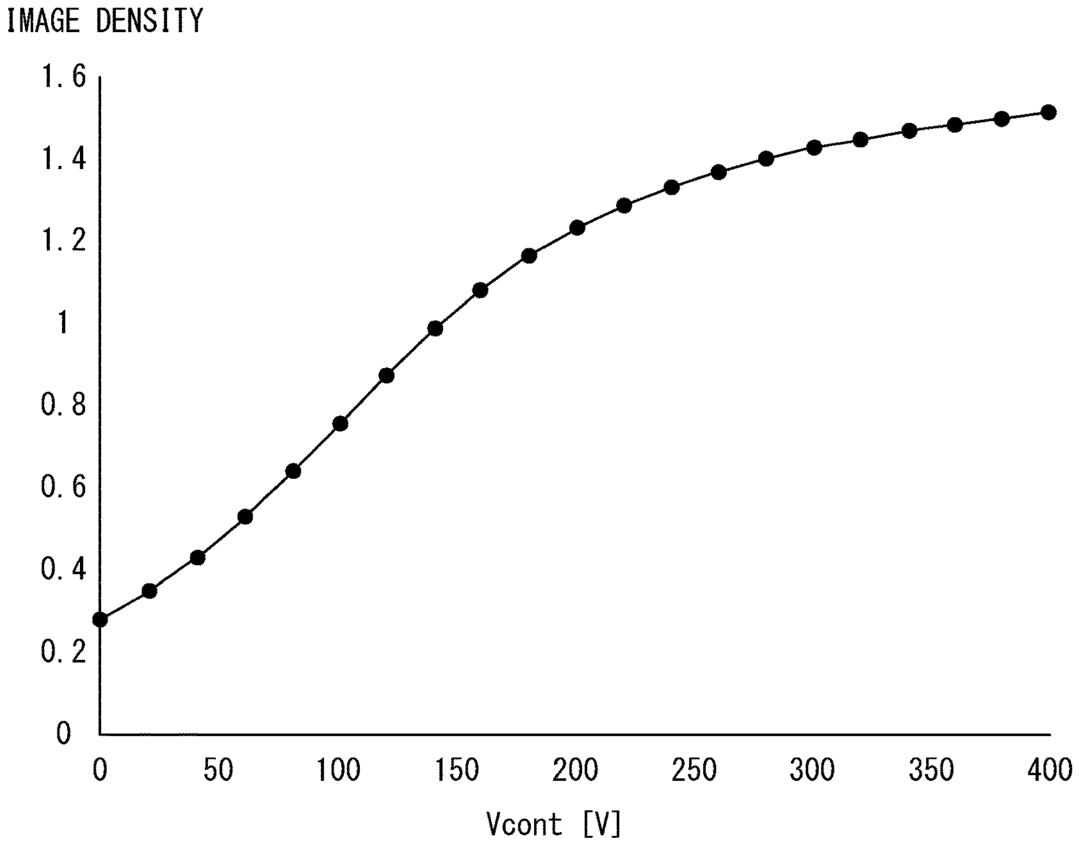
FIG. 3 is a graph representing a developing gamma characteristic.

Here, Vcont=Vl−Vdc is defined as a development contrast. The development contrast Vcont is an index of the toner driving force in the development portion. FIG. 3 is a graph showing the relationship between the development contrast Vcont and reflection density (image density) of the toner image on the sheet S (hereinafter referred to as "development gamma characteristic"). As the development contrast Vcont increases, the amount of the toner adhering to the photosensitive drum 1 increases and the image density increases.

Further, Vback=Vdc−Vd is defined as a fog removal potential Vback. In general, in a case where the fog removal potential Vback is small, the amount of the toner adhered to the non-exposed portion of the photosensitive drum 1 increases, and in a case where the fog removal potential Vback is large, the amount of the carrier adhered to the non-exposed portion of the photosensitive drum 1 increases. Adherence of the toner to the non-exposed portion of the photosensitive drum 1 causes deterioration of image quality as "fogging". The adhesion of the carrier to the non-exposed portion of the photosensitive drum 1 causes transfer failure of the toner image at the primary transfer portion T1 and cleaning failure by the drum cleaner 6.

Figure 4:
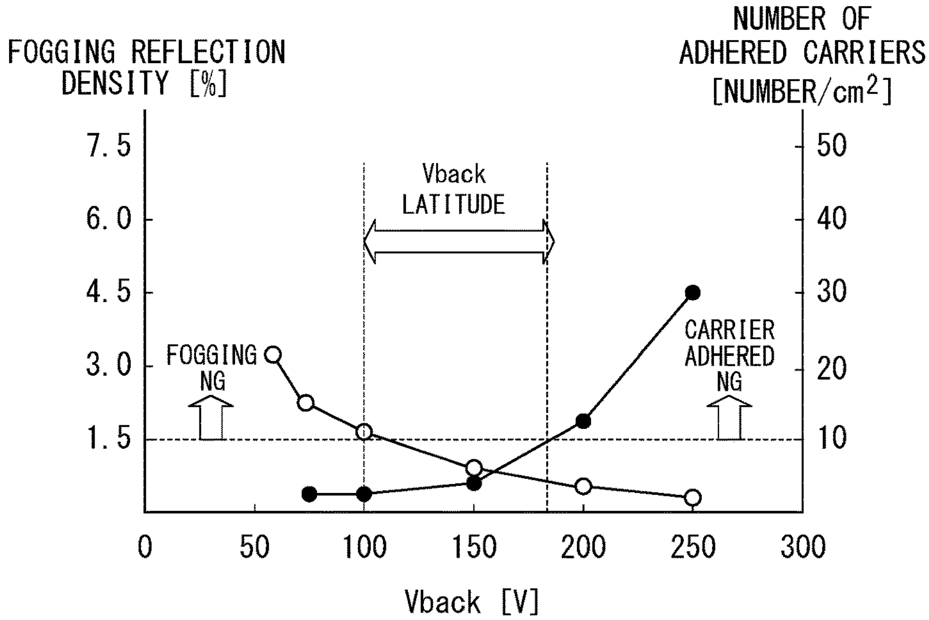
FIG. 4 is an explanatory diagram representing relationship of fogging and career adhesion with respect to fog removal potential.

Therefore, the fog removal potential Vback must be set within an appropriate range (hereinafter referred to as "Vback latitude"). FIG. 4 is an explanatory diagram of the relationship between the fog removal potential Vback and the fogging and the carrier adhesion. In the first embodiment, the Vback latitude is a range of the fog removal potential Vback that satisfies the fogging reflection density on the photosensitive drum 1 of 1.5% or less and the number of the adhered carriers on the photosensitive drum 1 of 10 carriers/$cm^2$ or less.

<Reflective Sensor>

As shown in FIG. 1, an image density sensor 70 is arranged downstream of the image forming units Pa to Pd in a rotation direction of the intermediate transfer belt 7. The image density sensor 70 can detect the image density of the toner image transferred onto the intermediate transfer belt 7 by detecting the reflectance of the intermediate transfer belt 7. The image forming apparatus 200 includes the image density sensors 70 corresponding to yellow, magenta, cyan, and black colors, however, since they have a common configuration, the color differences will be omitted.

Figure 5:
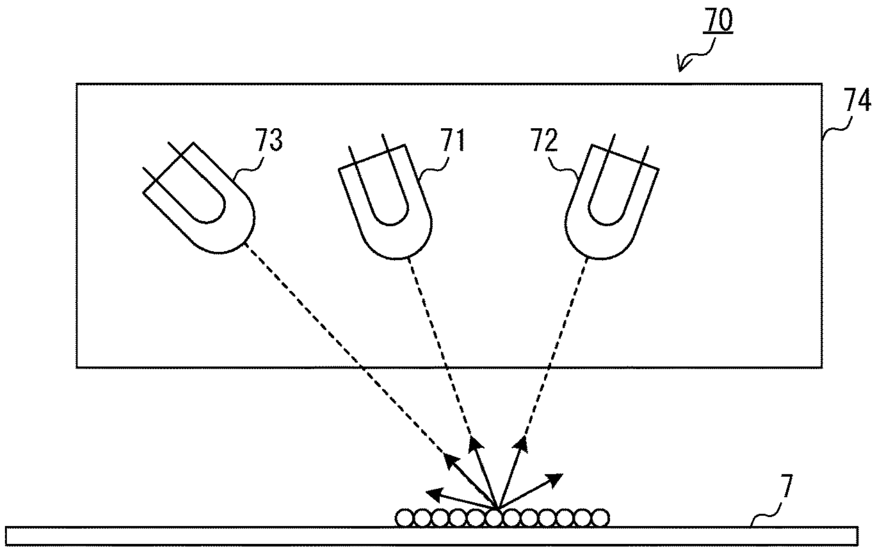
FIG. 5 is a configuration diagram illustrating an image density sensor.

FIG. 5 is a configuration diagram of the image density sensor 70. The image density sensor 70 is arranged to face the surface of the intermediate transfer belt 7 onto which the toner image is transferred. The image density sensor 70 includes a light emitting portion 71 for emitting infrared rays, light receiving portions 72 and 73 for receiving infrared rays, and an electric substrate 74 on which the light emitting portion 71 and the light receiving portions 72 and 73 are provided. The light emitting portion 71 is, for example, an LED (Light Emitting Diode). The light receiving portions 72 and 73 are photodiodes, for example.

The light emitting portion 71 is arranged to irradiate the intermediate transfer belt 7 with infrared rays at an incident angle of 20 degrees. The light receiving portion 72 is positioned to receive, at a reflection angle of −20 degrees, specularly reflected light of the light irradiated onto the intermediate transfer belt 7 and the toner image transferred onto the intermediate transfer belt 7. The light receiving portion 73 is positioned to receive, at a reflection angle of 50 degrees, the diffusely reflected light of the light irradiated, by the light emitting portion 71, onto the intermediate transfer belt 7 and the toner image transferred onto the intermediate transfer belt 7. The electric substrate 74 includes a drive circuit which supplies current to the light emitting portion 71 and a light receiving circuit which has an IV conversion function to convert current flowing according to an amount of light received by the light receiving portions 72 and 73 into voltage.

<Phase Detection>

Figure 6:
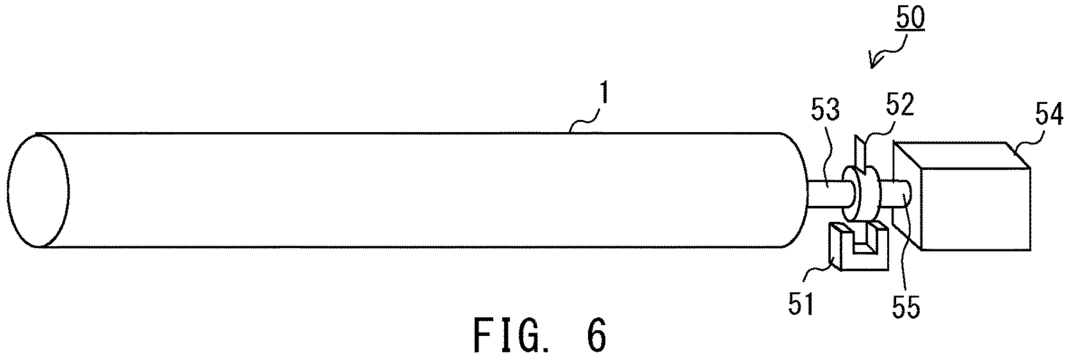
FIG. 6 is an explanatory diagram of a phase detection portion.

Each of the photosensitive drum 1, the charger 2, and the developing sleeve of the developing device 4 has a phase detection portion for detecting the phase during rotation. FIG. 6 is an explanatory diagram of the phase detection portion for detecting the rotation phase of the photosensitive drum 1. The phase detection portion 50 of the first embodiment has a configuration in which a photointerrupter 51 is provided.

A drum shaft 53 around which the photosensitive drum 1 rotates is connected to an output shaft 55 of a driving motor 54 via a coupling (not shown). In this configuration, the photosensitive drum 1 is rotationally driven by driving the driving motor 54. In addition to the photointerrupter 51, the phase detection portion 50 has a light shielding member 52 which is provided integrally with the drum shaft 53 to rotate as the drum shaft 53 rotates. The light shielding member 52 is detected by the photointerrupter 51 in a case where the photosensitive drum 1 reaches a predetermined rotational position. Thus, the photointerrupter 51 can detect the rotation phase of the photosensitive drum 1. The charger 2 and the developing sleeve also have substantially the same configuration to detect the rotation phase.

In the example shown in FIG. 6, the photosensitive drum 1 is driven by a direct drive system in which the driving motor 54 is directly connected to the photosensitive drum 1, however, a speed reduction mechanism for the power transmissions may be provided between the photosensitive drum 1 and the driving motor 54. The same applies to the drive of the developing sleeve. Since the charger 2 is driven by the rotation of the photosensitive drum 1 as described above, no driving motor is required.

Figure 7:
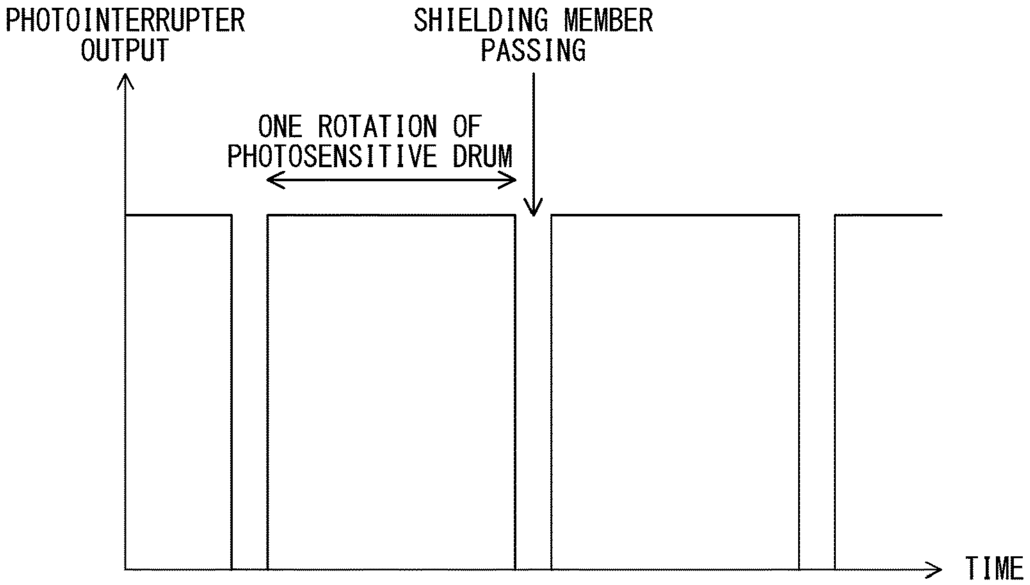
FIG. 7 is an exemplary diagram of a photointerrupter.

FIG. 7 is an exemplary output diagram of the photointerrupter 51. In a case where the light shielding member 52 rotating in synchronization with the photosensitive drum 1 passes through the photointerrupter 51, an output signal of the photointerrupter 51 drops to approximately 0V. By detecting a trailing edge of the output signal at this time, the rotation phase of the photosensitive drum 1 is calculated. Assuming that the rotation phase at the trailing timing of the output signal is zero, the phase advances by a in one period of the photosensitive drum 1. Based on this, it is possible to calculate the rotational phase of the photosensitive drum 1 at a predetermined timing during rotational driving. In the first embodiment, the timing at which the output signal of the photointerrupter 51 becomes 0V due to the passing of the light shielding member 52 is set as "home position".

<Control Unit>

Figure 8:
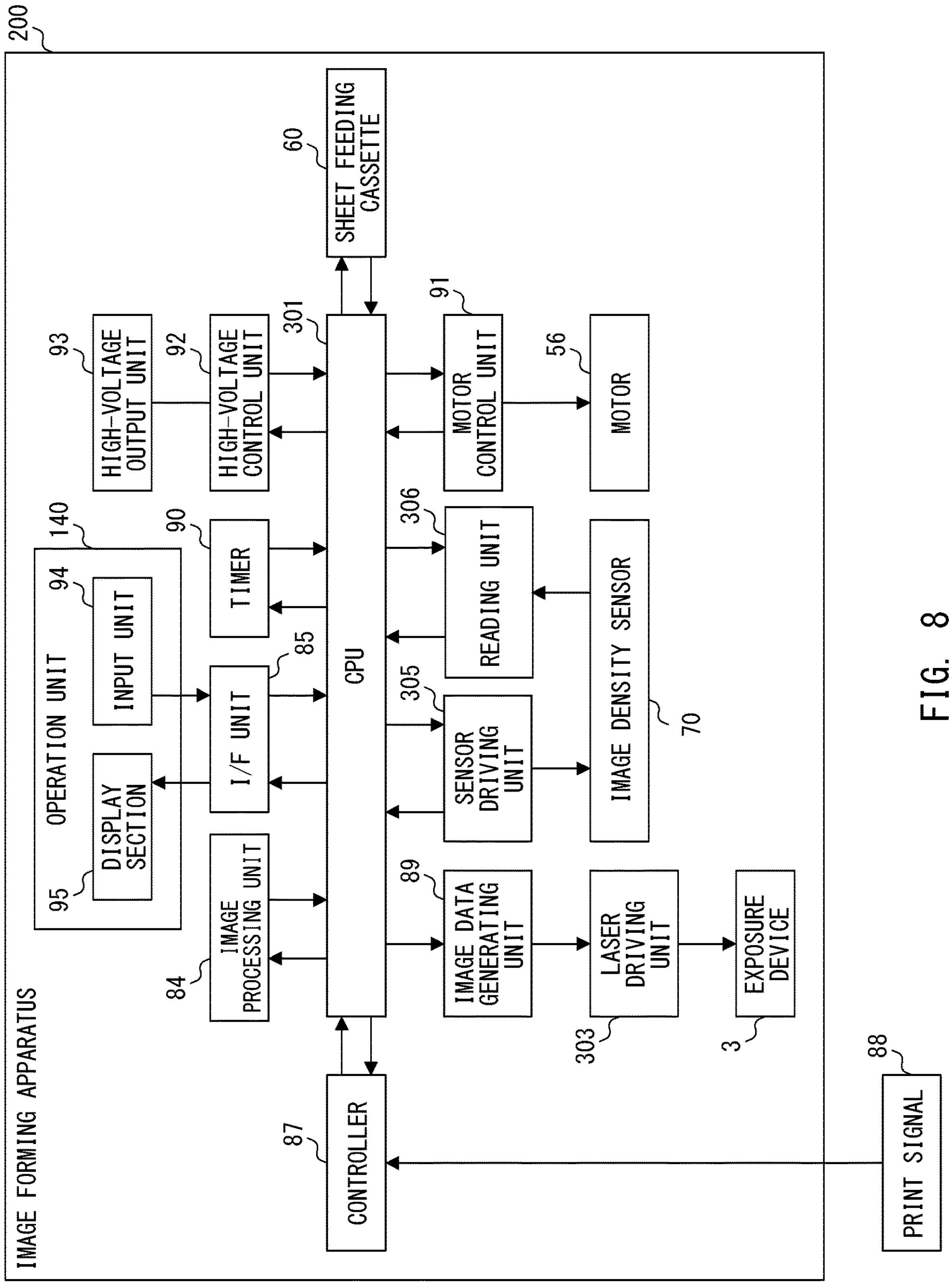
FIG. 8 is a configuration diagram of a control unit.

FIG. 8 is a configuration diagram of a control unit for controlling the operation of the image forming apparatus 200. The control unit is installed in the image forming apparatus 200. The control unit includes a central processing unit (CPU) 301. A controller 87, an image processing portion 84, an I/F unit 85, a timer 90, a high-voltage control unit 92, an image data generating unit 89, a sensor driving unit 305, a reading unit 306, and a motor control unit 91 are connected to the CPU 301.

The CPU 301 has a function to execute processing of generating various command signals and computation processing in order to operate various sensors, motors, and the like provided in the image forming apparatus 200. The CPU 301 has a built-in memory for storing data. The image data generating unit 89 has a function to convert, under control of the CPU 301, various image data into a control signal (driving signal) for laser control to transmit the control signal to a laser driving unit 303. The image data generating unit 89 also has a function to generate a test image for detecting image density.

The laser driving units 303 are provided such that the number of the laser driving units 303 corresponds to the number of exposure devices 3. In the first embodiment, four laser driving units 303 are provided because four exposure devices 3 are provided. The laser driving unit 303 has a function to drive a laser light-emitting element of the exposure device 3 based on a control signal (driving signal) obtained from the image data generating unit 89 and control the lighting and the amount of light of the laser.

The sensor driving unit 305 and the reading unit 306 are connected to the image density sensor 70. The sensor driving unit 305 has a function to control the light emission and driving current of the light emitting portion 71 inside the image density sensor 70 according to command signals acquired from the CPU 301. The reading unit 306 amplifies the received light electrical signal which is output from the image density sensor 70 to transmit the amplified received light electrical signal to the CPU 301 as a detection result of the image density sensor 70.

The motor control unit 91 is electrically connected to a plurality of motors 56 arranged in the image forming apparatus 200, such as the driving motor 54, and has a function to control drive timing and drive speed. The motor control unit 91 controls each motor 56 according to the command signals acquired from the CPU 301.

The high-voltage control unit 92 is electrically connected to the high-voltage output unit 93 to control outputs of bias voltages necessary for the image forming process, such as charging bias, development bias, and transfer bias, according to command signals acquired from the CPU 301. The high-voltage output unit 93 is a charging high-voltage power supply described above or the developing high voltage power supply.

The CPU 301 is connected to the operation unit 140 through the I/F unit 85. The operation unit 140 is equipped with an input unit 94 and a display section 95. The input unit 94 may be operation buttons, a touch panel, and the like. The operation unit 140 may be, in addition to the configuration in which it is provided in the image forming apparatus 200, an external terminal such as a personal computer or the like connected to the image forming apparatus 200. The CPU 301 is electrically connected to the controller 87 and the image processing portion 84. A print signal 88 is sent to the CPU 301 through the controller 87. The CPU 301 can form an image signal by processing the acquired print signal 88 in the image processing portion 84.

<Sub-Scanning Uneven Density Correction>

Figure 9:
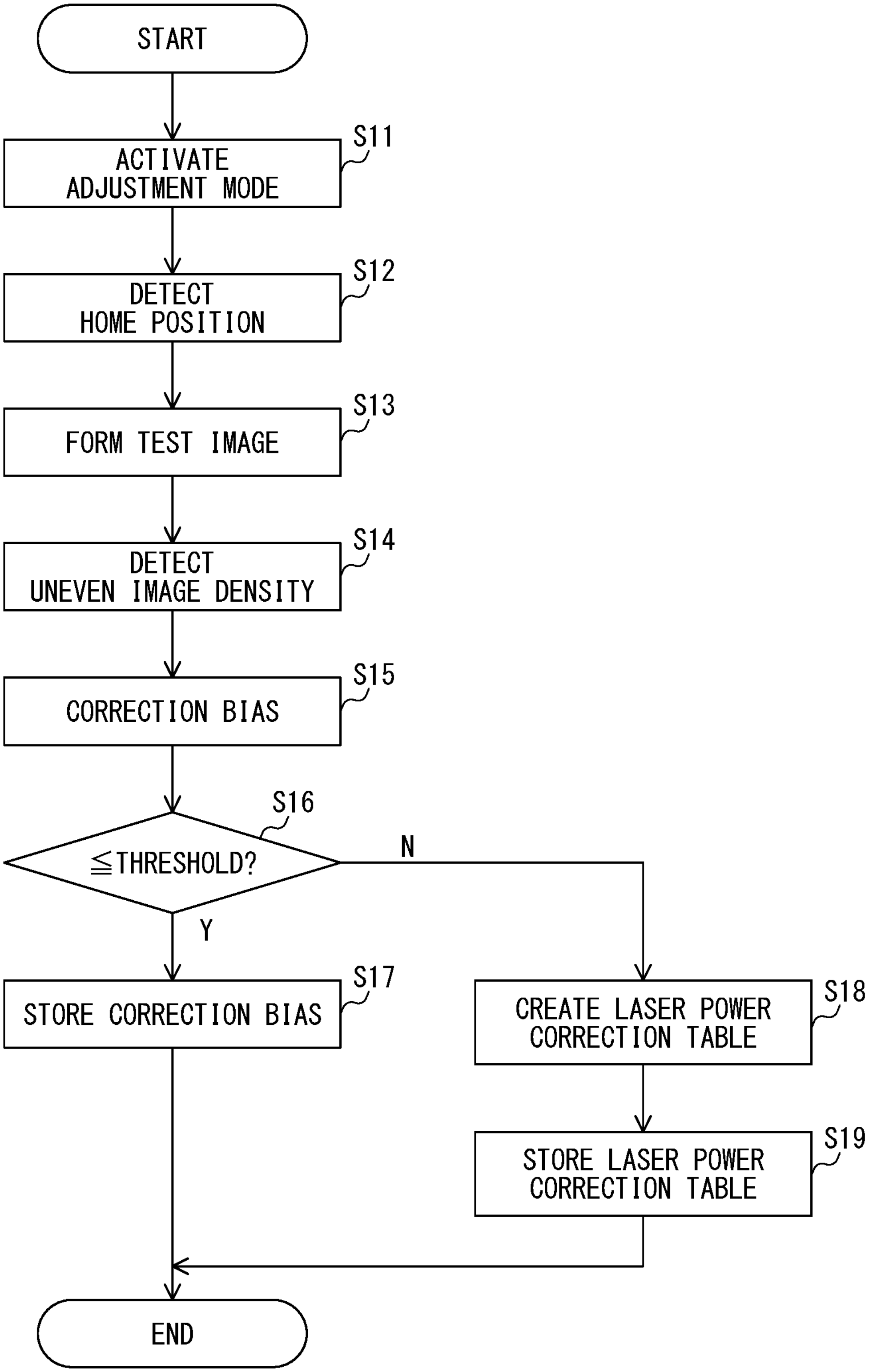
FIG. 9 is a flow chart representing a sub-scanning uneven density correction process.

FIG. 9 is a flow chart representing sub-scanning density unevenness correction processing by the image forming apparatus 200 having the above configuration.

In a case where the user or a service engineer instructs to execute the sub-scanning uneven density correction processing from the operation unit 140, the CPU 301 activates an adjustment mode for performing various adjustments (Step S11). In a case where the CPU 301 detects replacement of component parts of the image forming apparatus 200, the CPU 301 activates the adjustment mode to start the sub-scanning uneven density correction processing in the same manner as in a case where the execution of the sub-scanning uneven density correction processing is instructed. Next, the CPU 301 detects the home positions of the photosensitive drum 1, the charger 2, and the developing sleeve using the phase detection portion 50 which includes the photointerrupter 51 (Step S12). The CPU 301 stores the detection timing of the home position and the position of the patch image in the built-in memory, and forms a band-shaped test image on the intermediate transfer belt 7 (Step S13).

Figure 10:
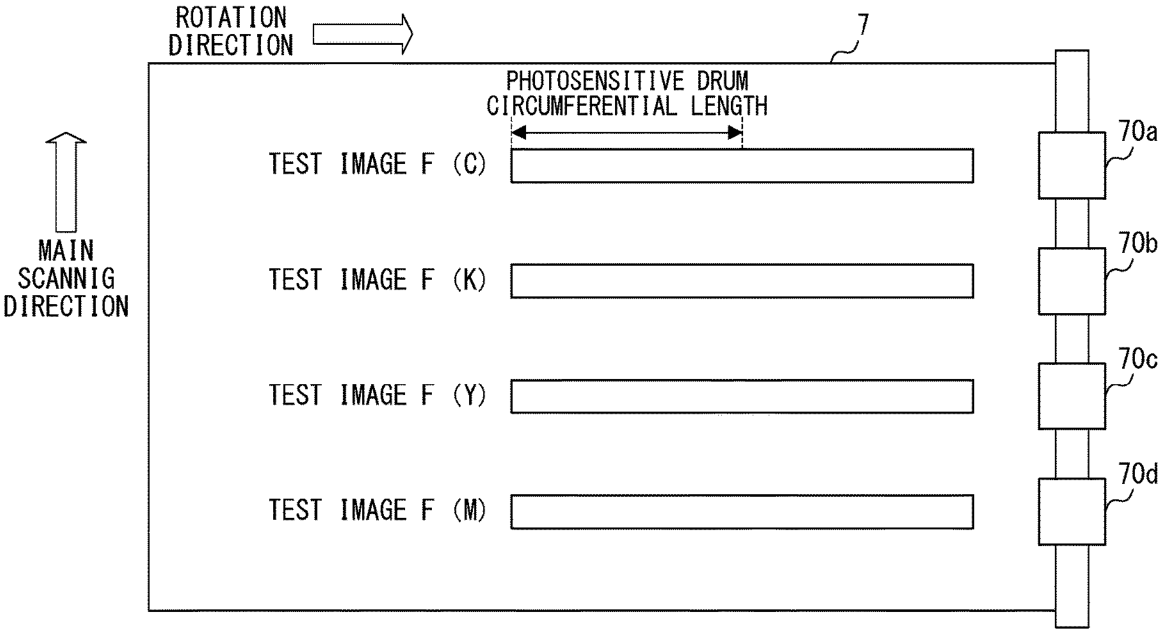
FIG. 10 is an exemplary diagram of a test image.

FIG. 10 is an exemplary diagram of the test image. The test image F is a single color, single tone band-shaped image extending in the sub-scanning direction for each of yellow (Y), magenta (M), cyan (C), and black (K). The test image F is formed with a tone in which the curve of the development gamma characteristic has a large slope. By using such a test image F, it becomes possible to detect with high sensitivity the uneven image density caused by uneven rotation of the photosensitive drum 1 or the developing sleeve, or caused by uneven potential by the charger 2. In the first embodiment, the image density of the test image F is set to 50% for each color with respect to the maximum density.

The test image F of each color is arranged in parallel in a direction (main scanning direction) perpendicular to the rotation direction of the intermediate transfer belt 7 so that four colors can be detected simultaneously. As the intermediate transfer belt 7 rotates, the test image F of each color is formed at a position such that it passes through a detection position of the corresponding image density sensor among the image density sensors 70*a* to 70*d*. The length of the test image F is set to twice the length of the maximum circumferential length (circumferential length of the photosensitive drum 1) which causes periodic occurrence of the uneven image density. This is to reduce effects of image density streak that occurred suddenly and unevenness of the intermediate transfer belt 7 and the like in addition to reducing effects of the periodic uneven image density.

The CPU 301 measures the image density of the test image F based on the detection results of the image density sensors 70*a* to 70*d* to detect the uneven image density (Step S14). The image densities of the cyan, magenta, and yellow test images are measured based on a detection result of the light receiving portion 73 which receives diffusely reflected light. The image density of the black test image is measured by a detection result of the light receiving portion 72 which receives specularly reflected light. The light receiving portion 72 detects both specularly reflected light component and diffusely reflected light component. Therefore, the CPU 301 acquires the specularly reflected light component by performing a correction operation to remove the diffusely reflected light component detected by the light receiving portion 73 from the reflected light component detected by the light receiving portion 72. The surface of the intermediate transfer belt 7 has a large amount of reflected light, and almost no reflected light is obtained from the toner. Therefore, as the image density of the toner image increases, the specular light component detected by the light receiving portion 72 decreases. The CPU 301 previously stores the relationship between the image density of the toner image and the diffusely reflected light and specularly reflected light of each color to obtain the image density of the toner image (test image) from the detected diffusely reflected light and the detected specularly reflected light. By sequentially detecting the image density of the toner image at a predetermined sampling rate, the CPU 301 creates an image density profile of the test image F for each color.

The CPU 301 generates a correction bias to be superimposed on each of the charging bias and the development bias based on the image density profile of each color (Step S15). In a case where the correction bias superimposed on the charging bias and the correction bias superimposed on the development bias is to be distinguished, the correction bias superimposed on the charging bias is referred to as "charge correction bias", and the correction bias superimposed on the development bias is referred to as "development correction bias". The correction bias is generated, for example, as follows.

The CPU 301 first extracts a periodic component of the developing sleeve from the spectrum of the amplitude and phase of each frequency component obtained by Fourier transforming the image density detection result (image density profile) of the test image F. The image forming apparatus 200 of the first embodiment has a processing speed of 240 mm/s, and the developing sleeve has a diameter of φ20 mm. The developing sleeve is rotationally driven at a peripheral speed of 180% with respect to the photosensitive drum 1. Therefore, the period Tdev of the developing sleeve is 145 milliseconds. The photosensitive drum 1 has a diameter of φ30 mm and is driven to rotate at a linear velocity of 240 mm/s. Therefore, the period Tdr of the photosensitive drum 1 is 392 milliseconds. The sub-scanning uneven density is uneven image density that occurs in the sub-scanning direction at the period Tdr of the photosensitive drum 1 and the period Tdev of the developing sleeve.

Next, the CPU 301 generates a DC component correction bias $\Delta Vdc = Va \times \cos(\omega 1 \times t + \theta 1)$ of the development bias and a DC component correction bias $\Delta Vd = Vb \times \cos(w2 \times t + \theta 2)$ of the charging bias. The correction bias is a bias voltage for canceling the sub-scanning uneven density caused by the period Tde of the photosensitive drum 1 and the period Tdev of the developing sleeve. By the correction bias, in order to generate the development contrast corresponding to the amplitude of the uneven image density, the potential Vd of the non-exposed portion and the DC component Vdc of the development bias are modulated in opposite phases, considering a phase difference due to the time difference from development to image density detection.

A specific method of generating the development correction bias will be described. The CPU 301 calculates, from an amplitude D of the periodic component of the developing sleeve extracted in a sub-scanning uneven density detection process and a slope of a development gamma characteristic, a development contrast difference Va corresponding to the amplitude D. The phase θ is represented by $\theta = \Phi - \omega \times \Delta t + \pi$. In the above formula, Δt is the time difference between an image density detection timing and a development bias application timing, and is expressed as $\Delta t = ds/S$ using a process speed S and a distance ds from a development position to a detection position of the image density sensor 70. Values of the development contrast difference Va, ω, and the phase θ obtained by a series of processes are stored in the memory within the CPU 301.

After generating the correction bias, the CPU 301 subsequently determines whether the total voltage of the amplitude Vb of the charge correction bias obtained as described above and the amplitude Va of the development correction bias is equal to or less than the threshold value Vth of the fog removal potential Vback (Step S16). The amplitude Vb of the charge correction bias is a potential difference before correcting the charge bias and after correcting the charge bias. The amplitude Va of the development correction bias is a potential difference before correcting the development bias and after correcting the development bias. In the image forming apparatus 200 of the first embodiment, a fogging characteristic in the white background and a carrier adhesion characteristic with respect to the fog removal potential Vback is represented in FIG. 4. Therefore, the fog removal potential Vback that does not cause image quality deterioration is in the range of 100 to 180V, and the Vback latitude is 80V. Therefore, the threshold value Vth of the fog removal potential Vback in the first embodiment is set to 70V with an additional 10V margin.

In a case where the total voltage of the amplitude Vb of the charge correction bias and the amplitude Va of the development correction bias is equal to or less than the threshold value Vth (70V or less) (Step S16: Y), the CPU 301 stores the charge correction bias and the development correction bias generated in the process of Step S15 (Step S17) in the built-in memory. In this way, the adjustment mode is completed.

In a case where the total voltage of the amplitude Vb of the charge correction bias and the amplitude Va of the development correction bias exceeds the threshold value Vth (exceeding 70V) (Step S16: N), the CPU 301 stops the correction by the amplitude Vb of the charging correction bias and the development correction bias. The CPU301 performs correction of the uneven image density by adjusting a light amount (laser power) of the laser light output from the exposure device 3.

Figure 11:
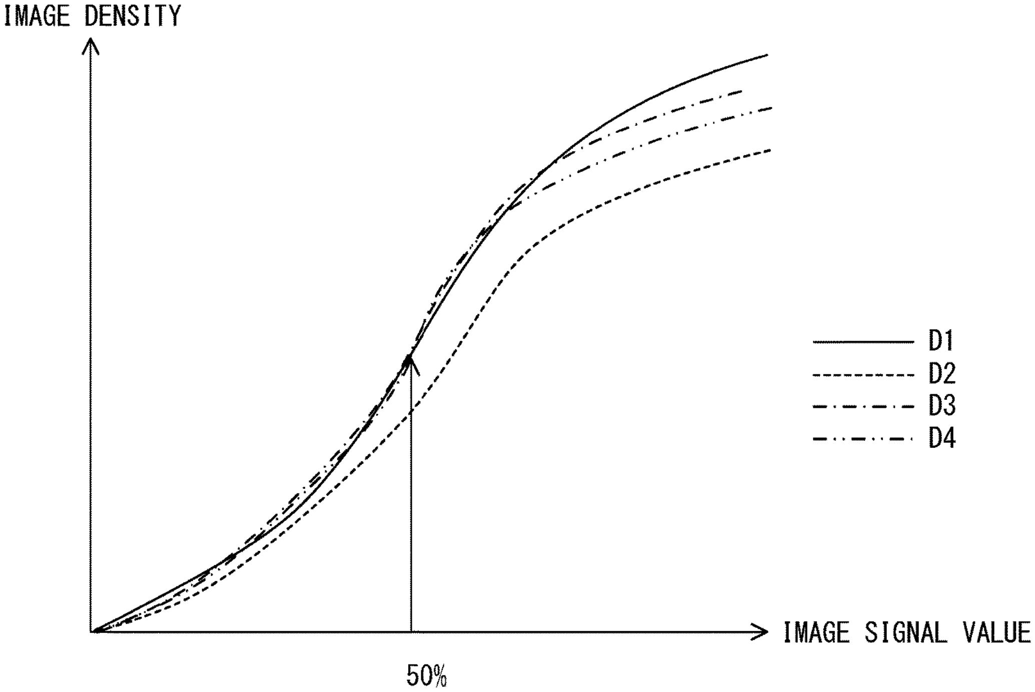
FIG. 11 is an explanatory diagram representing relationship between an image signal value and image density.

The difference between the correction bias and laser power correction will be described. FIG. 11 is an explanatory diagram of the relationship between image signal values and image densities. The image signal value is a value which is included in the image signal and represents the image density of the image to be formed. FIG. 11 illustrates a case where a gap between the developing sleeve and the photosensitive drum 1 varies due to eccentricity of the developing sleeve. A solid line D1 represents the image density in a normal state with no gap variation. A dotted line D2 represents the image density when the image density becomes low due to the gap variation. A dashed-dotted line D3 represents the image density when the development bias is adjusted to correct the image density represented by the dotted line D2. A two-dot-dotted line D4 represents the image density when the laser power is adjusted to correct the image density represented by the dotted line D2.

In the dotted line D2, the image density is lowered due to the gap between the developing sleeve and the photosensitive drum 1. Further, as to the curve of the dotted line D2, the image density is lowered as compared with the solid line D1 in a region having a higher density than in a region near the middle of the image signal value. In the case of the dashed-dotted line D3, the image density is corrected in the entire image density region by correcting the image density represented by the dotted line D2 with the development bias. As a result, the difference between the waveform of the dashed-dotted line D3 and the waveform of the solid line D1, which represents the normal image density, is within ±0.05 in each image density range.

In the case of the two-dotted dashed line D4, which is obtained by laser power correction of the image density represented by the dotted line D2, it is corrected in the same manner as the dashed-dotted line D3 in a region having lower density than a region near the image signal value of 50%, which is the density of the test image. However, in an area where the image density is higher than the image signal value of 50%, the two-dotted dashed line D4 shows that the amount of correction is insufficient as compared with the dashed-dotted line D3. Therefore, in an area where the toner fogging and the carrier adhesion, which affect the correction using the correction bias, do not occur, it is preferable to correct the image density using the correction bias, considering the relationship between the image signal and the image density waveform in FIG. 11.

The development correction bias and the charging correction bias modulate the DC component Vdc of the development bias and the potential Vd of the non-exposed portion, respectively, to create the waveform of the development contrast Vcont and correct the uneven image density. On the other hand, the laser power correction of the laser beam emitted from the exposure device 3 modulates the potential Vl of the exposed portion to create the waveform of the development contrast Vcont.

Therefore, the CPU 301 generates a waveform ΔVl by combining a development bias waveform ΔVdc and a charging bias waveform ΔVd generated in the process of Step S15. The CPU 301 creates a table representing a correction waveform of a laser power ΔP with respect to the correction amount corresponding to the generated waveform ΔVl (Step S18). FIG. 12 is a diagram representing relationship between the laser power during exposure by the exposure device 3 and the potential of the photosensitive drum 1. FIG. 12 represents the relationship between the amount of surface light on the photosensitive drum 1 and the potential when the photosensitive drum 1 is charged to −700V and exposed by changing the laser power of the exposure device 3. Based on this relationship, the CPU 301 creates a Vl-P conversion table from the relationship between a laser power ΔP and the potential Vl of the exposed portion to create a correction waveform for the laser power ΔP.

By changing the laser power in accordance with the corrected waveform of the laser power ΔP calculated in the process of S18, the potential Vl of the exposed portion changes. Therefore, the contrast potential Vcont changes, and the uneven image density, which causes adverse effects in the bias correction, is corrected.

The CPU 301 stores the corrected waveform of the laser power calculated in the process of Step S18 in the built-in memory (Step S19). The adjustment mode is completed by the above.

Through the above-described processing, the CPU 301 performs, in the subsequent image formation processing, the image forming under an image forming condition in which the bias correction waveform and the waveform of the laser power correction signal are superimposed or under an image forming condition based on the correction waveform of the laser power ΔP. This suppresses the occurrence of periodic uneven image density. The effect of sub-scanning uneven density correction by this process is explained below.

As shown in FIG. 4, the upper and lower limits of the fog removal potential Vback are determined by the allowable limits of the carrier adhesion and the fogging, respectively, and the Vback latitude is 80V. In the first embodiment, the threshold value Vth of the fog removal potential Vback is set to 70V in consideration of a margin of 10V. As shown in FIG. 3, in a case where the slope of the development gamma characteristic is ΔD=0.004 per 1V of the development contrast, the development contrast corresponding to an amplitude of D=0.2 for the periodic component of the sub-scanning uneven density is 50V, and the development contrast corresponding to an amplitude of D=0.4 of the periodic component of sub-scanning uneven density is 100V.

FIG. 13 is a table representing the effect of the first embodiment. FIG. 13 shows correction conditions for the sub-scanning uneven density correction, uneven image densities before and after the sub-scanning uneven density correction, and results of the fogging and the carrier adhesion. Regarding the fogging and the carrier adhesion, if it is within an allowable limit, it is indicated by "O", and if it exceeds the allowable limit, it is indicated by "x". The allowable limit for fogging is that the fogging reflectance on the photosensitive drum 1 is 1.5% or less, and the allowable limit for the carrier adhesion is that the number of carrier adhesions on the photosensitive drum 1 is carriers/cm$^2$ or less.

As to the condition (1) in which the uneven image density ΔD=0.2, the development contrast is 50V, which is less than or equal to the threshold value of the fog removal potential Vback. Therefore, even if the charging bias Vd and the development bias Vd are modulated, the fog removal potential Vback is within the Vback latitude range. As to the condition (2) in which the uneven image density ΔD=0.4 there is no threshold for the fog removal potential Vback, the development contrast requires a correction of 100V. Therefore, in a case where a correction exceeding the Vback latitude is performed, problems such as fogging carrier adhesion in the non-exposed portion occur. As to the condition (3) in which the threshold for the fog removal potential Vback is set and no further correction is performed, the correction is insufficient and an uneven image density of ΔD=1.2 remains. As to the condition (4), which is a correction control in the first embodiment, an uneven image density can be suppressed to ΔD=0.75. In addition, the problem of the fogging and the carrier adhesion in the non-exposed portion does not occur. Thus, the image forming apparatus 200 of the first embodiment is characterized by a larger correction range, though the accuracy of the correction control is lower than when using the correction bias.

As described above, by performing the sub-scanning uneven density correction, in the first embodiment, it is possible to reduce periodic image density fluctuations which occur in the sub-scanning direction. Further, by changing the fog removal potential Vback within an appropriate range, it is possible to prevent deterioration of the quality of products caused by the fogging and device failure due to the carrier adhesion.

In the configuration of the above description, the image density sensor 70 on the intermediate transfer belt 7 reads the test image at the time of the uneven image density correction. In order to detect the uneven image density with higher accuracy, the test image may be printed on the sheet S, and after printing, the test image on the sheet S may be read by a sensor or scanner.

Second Embodiment

The configuration of the image forming apparatus 200 of the second embodiment is similar to that of the first embodiment shown in FIG. 1. In the sub-scanning uneven density correction processing of the first embodiment, the threshold of the fog removal potential Vback is set to 70V. On the other hand, in the sub-scanning uneven density correction processing in the second embodiment, the threshold of the fog removal potential Vback is changed according to the environmental conditions of the image forming apparatus 200.

In the second embodiment, an environment sensor 80 (see FIG. 1) is used to detect the ambient environment of the image forming apparatus 200. The environment sensor 80 is a temperature and humidity sensor which measures both temperature and relative humidity around the image forming apparatus 200. The environment sensor 80 is located near the periphery of the image forming apparatus 200.

<Control Unit>

Figure 14:
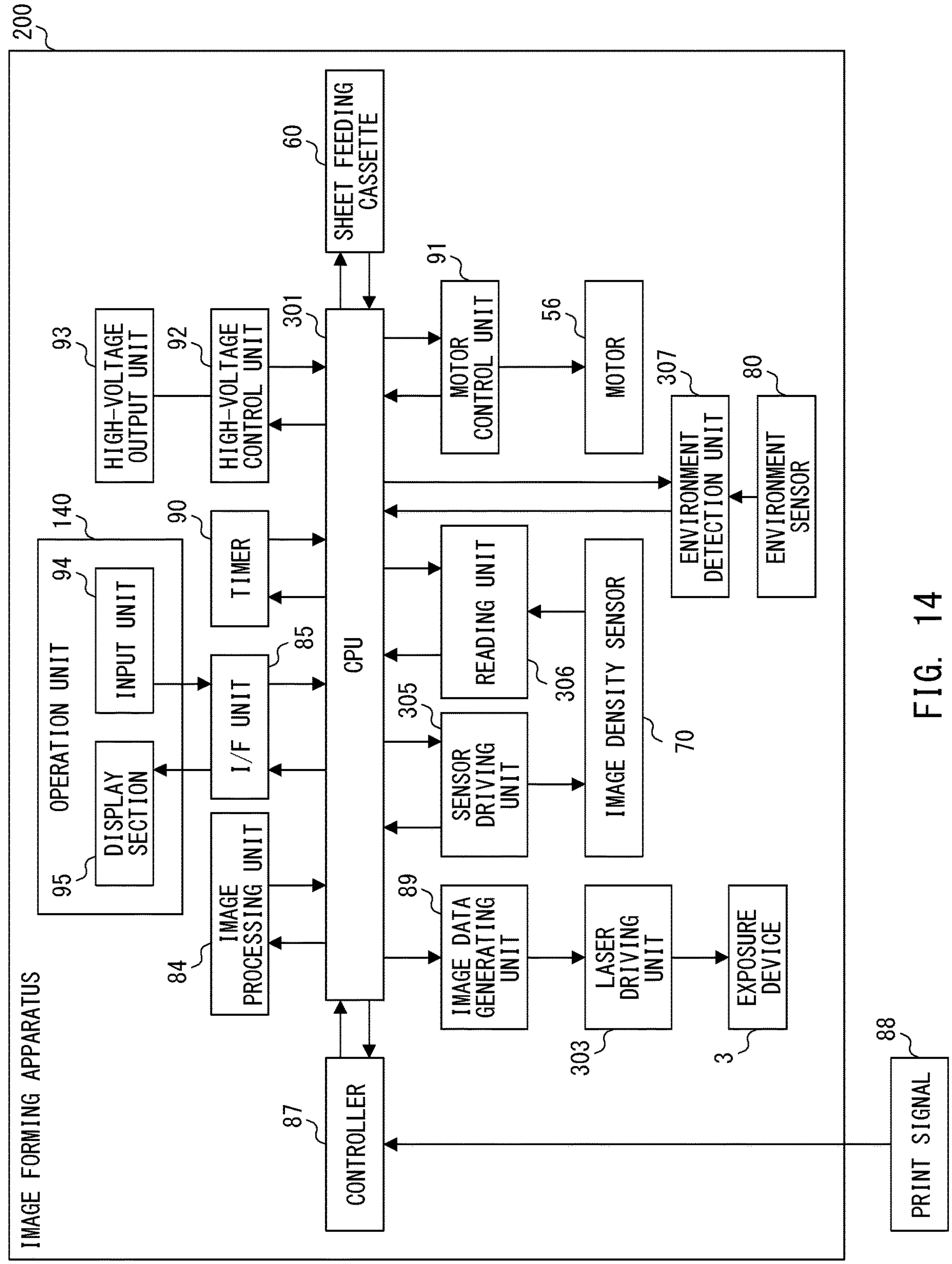
FIG. 14 is a configuration diagram of a control unit.

FIG. 14 is a configuration diagram of a control unit of the second embodiment. The control unit of the second embodiment has a configuration in which an environment detection unit 307 and the environment sensor 80 are added to the control unit of the first embodiment illustrated in FIG. 8. The description of the same configuration as in the first embodiment is omitted. The environment detection unit 307 amplifies an electrical signal related to the temperature and relative humidity output from the environment sensor 80 to transmit the amplified electrical signal to the CPU 301 as a detection result of the environment sensor 80. The CPU 301 detects the installation environmental conditions (temperature, relative humidity) of the image forming apparatus 200 based on the detection result of the environment sensor 80 obtained from the environment detection unit 307.

<Sub-Scanning Uneven Density Correction>

Figure 15:
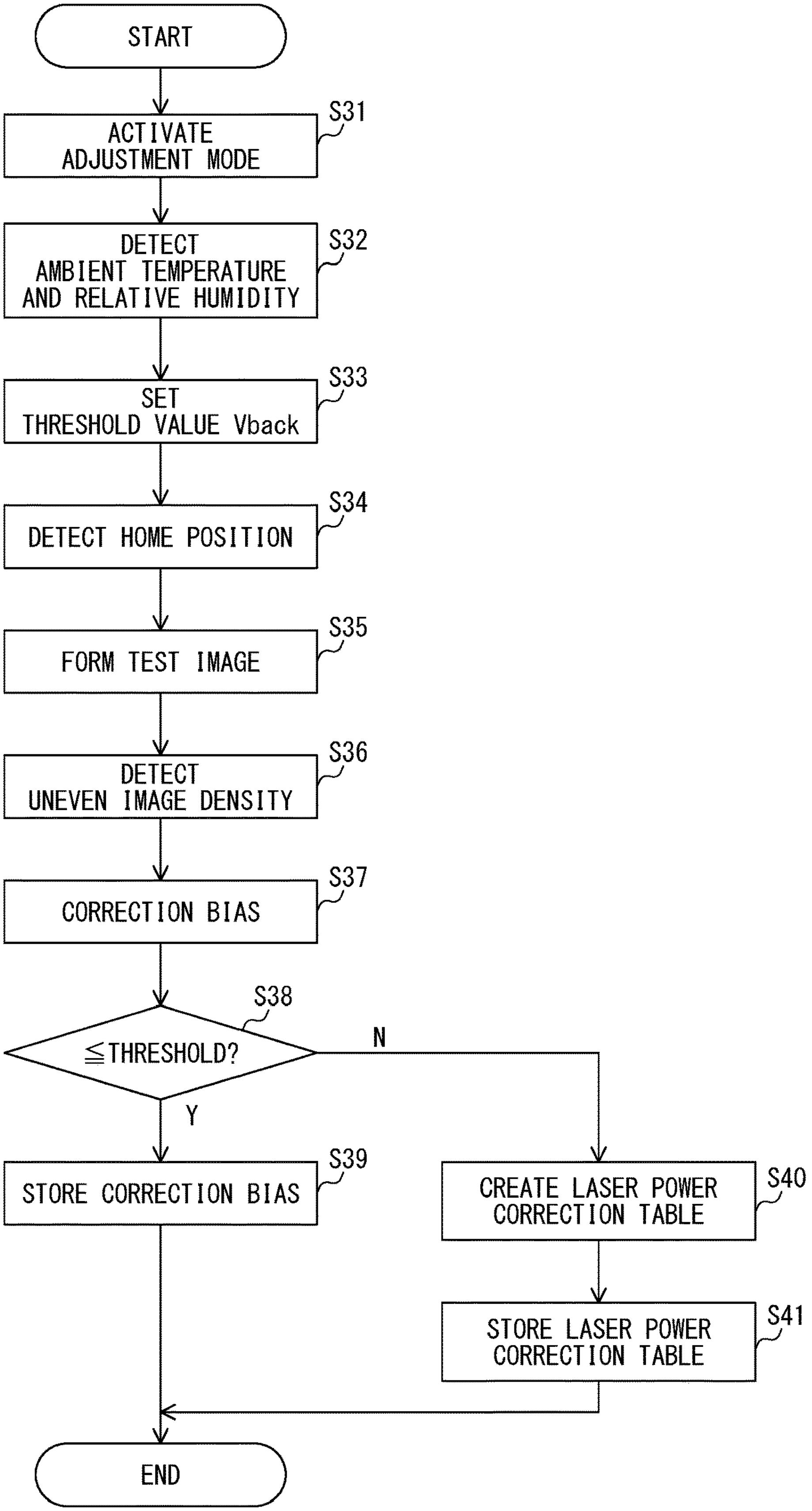
FIG. 15 is a flow chart representing a sub-scanning uneven density correction process.

FIG. 15 is a flow chart representing the sub-scanning uneven density correction processing of the second embodiment.

In a case where the user or the service engineer instructs to execute the sub-scanning uneven density correction processing from the operation unit 140, the CPU 301 activates an adjustment mode for performing various adjustments (Step S31). The CPU 301 detects, using the environment sensor 80, the ambient temperature and the relative humidity around the image forming apparatus 200 (Step S32). The CPU 301 calculates an amount of an absolute moisture content using the following Formula 1 and Formula 2 based on the detected temperature T (° C.) and relative humidity Rh (%).

$$\text{Absolute moisture content}=(Rws \times Rh)/(273+T) \quad \text{(Formula 1)}$$

$$Rsw=6.1164\times10\hat{}[\{7.591(273+T)\}/\{240.7\pm(273+T)\}] \quad \text{(Formula 2)}$$

Figure 16:
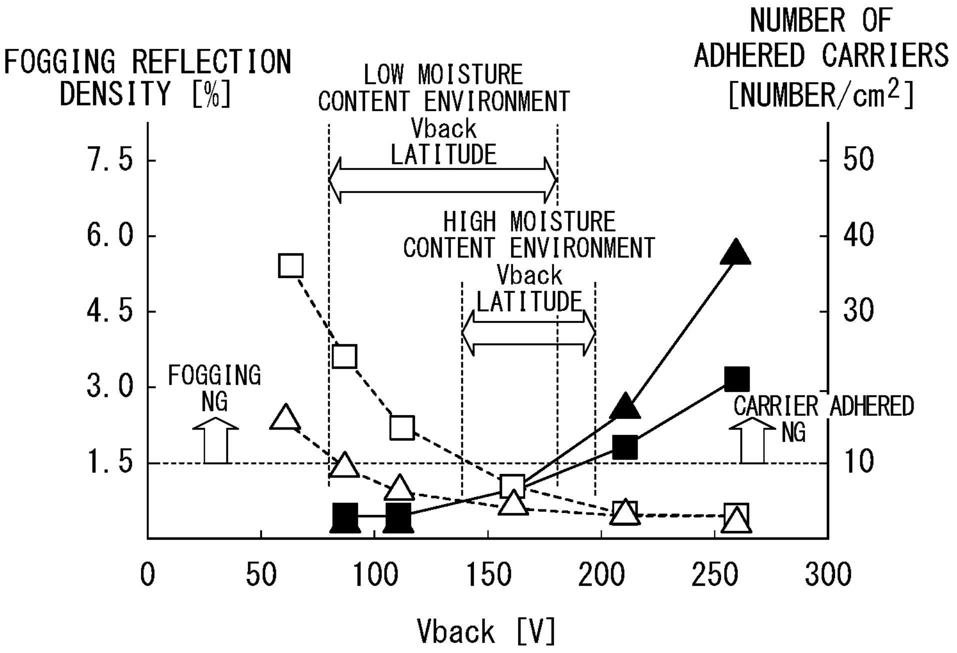
FIG. 16 is an explanatory diagram representing relationship of the fogging and the career adhesion with respect to the fog removal potential.

The CPU 301 sets the threshold value Vth of the fog removal potential Vback based on the calculated absolute moisture content (Step S33). FIG. 16 is an explanatory diagram of the relationship between the fogging and the carrier adhesion with respect to the fog removal potential Vback. In the second embodiment, "Vback latitude" is defined as a range of the fog removal potential Vback that satisfies 1) fogging reflection density on the photosensitive drum 1 is 1.5% or less and 2) the number of carrier adhesion on the photosensitive drum 1 is 10 carriers/$cm^2$ or less.

In FIG. 16, an open triangle indicates the fogging reflection density for the non-exposed portion in a low moisture content environment (temperature 23° C./relative humidity 5% RH: absolute water content 1 g/$m^3$). A black triangle indicates the number of carrier adhesions for the non-exposed portion in the low moisture content environment. A white square indicates the fogging reflection density for the non-exposed portion in a high moisture content environment (temperature 30° C./relative humidity 80% RH: absolute moisture content 22 g/$m^3$). A black square indicates the number of carrier adhesions for the non-exposed portion in the high moisture environment.

In the low moisture content environment, as to the polyester resin of the non-magnetic toner, the charge control agent, and the resin coat of the magnetic carrier, the adhesion of water is small and the electrical resistivity becomes high. By triboelectrifying the toner and the carrier, the charge amount of the toner becomes high negative and the charge amount of the carrier becomes high positive. As shown in FIG. 2, the potential Vd of the non-exposed portion is more negative than the potential Vdc of the developing sleeve, therefore, the negatively charged toner having a high charge amount is less likely to move to the non-exposed portion. Contrary to this, the positively charged carriers having a high charge amount is more likely to move to the non-exposed portion.

In the image forming apparatus 200 of the second embodiment, the fogging reflection density is 1.5% or less in a case where the fog removal potential Vback is 70V or more, and the number of carrier adhesion is 10 or less in a case where the fog removal potential Vback is 170V or less. Therefore, the range in which the fog removal potential Vback can be used without problems is a Vback latitude having 100V range from 70V to 170V.

In the high moisture content environment, for the polyester resin of the non-magnetic toner, the charge control agent, and the resin coat of the magnetic carrier, the adhesion of water is large and the electrical resistivity becomes low. By triboelectrifying the toner and the carrier, the charge amount of the toner becomes low negative and the charge amount of the carrier becomes low positive. Therefore, the negatively charged toner having a low charge amount is likely to move to the non-exposed portion, and the positively charged carrier having a low charge amount is less likely to move to the non-exposed portion.

In the image forming apparatus 200 of the second embodiment, the fogging reflection density is 1.5% or less in a case where the fog removal potential Vback is 130V or more, and the number of carrier adhesion is 10 or less in a case where the fog removal potential Vback is 185V or less. Therefore, the range in which the fog removal potential Vback can be used without problems is a Vback latitude having 55V range from 130V to 185V.

Figure 17:
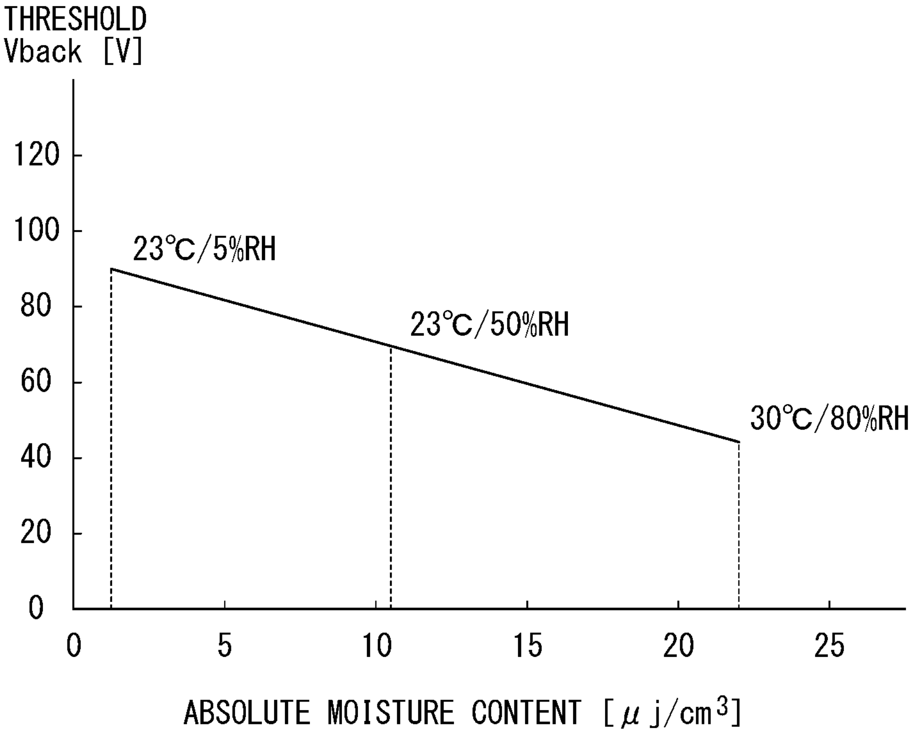
FIG. 17 is an explanatory diagram representing an absolute amount of moisture in an installation environmental condition and a threshold.

Therefore, as to the image forming apparatus 200 provided in the high moisture content environment, in a case where the charging correction bias, which has a large amplitude, or the development correction bias is superimposed, problems due to the fogging or the carrier adhesion in the non-exposed portion will likely to occur. FIG. 17 is an explanatory diagram of the relationship between the absolute moisture content detected by the environment sensor 80 and the threshold value of Vback in the sub-scanning uneven density correction processing in the installation environmental condition. As shown in FIG. 17, the threshold value Vth of the fog removal potential Vback decreases as the absolute moisture content in the environment increases.

The CPU 301, after generating the threshold value Vth of the fog removal potential Vback, generates the correction bias by the same processing as Steps S12-S15 in FIG. 9 (Steps S34-S37). The CPU 301, after generating the correction bias, whether the total voltage of the amplitude Vb of the charge correction bias and the amplitude Va of the development correction bias is equal to or less than the threshold value Vth of the fog removal potential Vback generated according to the absolute moisture content in the installation environmental condition (Step S38).

In a case where the total voltage of the amplitude Vb of the charge correction bias and the amplitude Va of the development correction bias is equal to or less than the threshold value Vth of the fog removal potential Vback (Step S38: Y), the CPU 301 stores the correction bias generated in the process of Step S37 in the built-in memory (Step S39). In this way, the adjustment mode is completed.

In a case where the total voltage of the amplitude Vb of the charge correction bias and the amplitude Va of the development correction bias exceeds the threshold value Vth (Step S38: N), the CPU 301 stops the correction by the amplitude Vb of the charging correction bias and the development correction bias. The CPU301 performs correction of the uneven image density by adjusting a light amount (laser power) of the laser light output from the exposure device 3. Therefore, the CPU 301 creates a table representing the correction waveform of a laser power ΔP, as in the process of Step S18 shown in FIG. 9. By changing the laser power in accordance with an uneven image density waveform calculated in the process of Step S40, the potential Vl of the exposed portion changes. Therefore, the contrast potential Vcont changes and the uneven image density that could not be corrected by the bias correction.

The CPU 301 stores the corrected waveform of the laser power calculated in the process of Step S40 in the built-in memory (Step S41). The adjustment mode is completed by the above.

Through the above-described processing, the CPU 301 performs, in the subsequent image formation processing, the image forming under an image forming condition in which the bias correction waveform and the waveform of the laser power correction signal are superimposed or under an image forming condition based on the correction waveform of the laser power ΔP. This suppresses the occurrence of periodic uneven image density. The effect of sub-scanning uneven density correction by this process is explained below.

In the second embodiment, the environment sensor 80 detects the installation environmental condition such as temperature and relative humidity, and changes the threshold value of the fog removal potential Vback according to the installation environmental condition. Thus, it is possible to reduce periodic image density fluctuations occurring in the sub-scanning direction even in environments where the absolute moisture content is different. Further, by changing the fog removal potential Vback within an appropriate range, it is possible to prevent deterioration of the quality of products caused by the fogging and device failure due to the carrier adhesion.

As in the first embodiment, in order to detect the uneven image density with higher accuracy, for reading the test image at the time of correcting the uneven image density, the test image may be printed on the sheet S, and after printing, the test image on the sheet S may be read by a sensor or scanner.

As described in the first and second embodiments, the image forming apparatus 200 acquires the periodic fluctuation information which represents periodic fluctuation of the uneven image density from a detection result of the image density of the test image. Based on the periodic fluctuation information, by changing at least one of the charging bias and development bias, or by changing the laser power, the uneven image density is corrected. Δt this time, the image forming apparatus 200 controls a light volume of the laser light output from the exposure device 3 in a case where a charging potential of the photosensitive drum 1 and an amount of fluctuation of the development bias exceeds a predetermined threshold. As a result, the periodic uneven image density which occurs during image forming is corrected to be within a range in which the fog removal potential does not deviate from the appropriate range. Thus, the fogging and the carrier adhesion can be prevented and in-plane uneven image density can be reduced at the same time. The image density correction by the laser power of the laser light emitted from the exposure device 3 is performed by modulating the laser power as described in the first embodiment, however, the image density correction may be performed by a configuration in which an image signal value is modulated. Thus, the image forming apparatus 200 can prevent deterioration of the quality of products caused by the fogging and to reduce the risk of device failure due to the carrier adhesion while reducing the uneven image density that occurs periodically.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-174681, filed Oct. 26, 2021, which is hereby incorporated by reference herein in its entirety.

What is claimed is:

1. An image forming apparatus comprising:
- an image forming unit comprising:
  - a photosensitive member;
  - a charging unit configured to uniformly charge the photosensitive member;
  - an exposure unit configured to form an electrostatic latent image on the photosensitive member by scanning the charged photosensitive member with laser light; and
  - a developing device configured to develop the electrostatic latent image to form an image on the photosensitive member;
- a reading unit configured to read a test image, which is formed by the image forming unit, for detecting an image density of the image; and
- a controller configured to:
  - control the image forming unit to form the test image;
  - detect periodic fluctuation of the image density based on a detection result of the test image which is acquired by controlling the reading unit to read the test image;
- correct an image forming condition to suppress the detected fluctuation;
- generate, based on the periodic fluctuation of the image density, a first correction bias for correcting a charging bias for charging the photosensitive member by the charging unit;
- generate, based on the periodic fluctuation of the image density, a second correction bias for correcting a development bias for development by the developing device;
- generate, in a state where a total of an amplitude of the first correction bias and an amplitude of the second correction bias exceeds a predetermined threshold, a laser power correction signal for correcting an amount of the laser light from the exposure unit based on the periodic fluctuation of the image density; and
- control the image forming unit to form an image with the image forming condition in which a driving signal of the exposure unit is corrected with the laser power correction signal.

2. The image forming apparatus according to claim 1, wherein the controller is configured to:
- correct, in a state where the total is less than or equal to the predetermined threshold, the charging bias with the generated first correction bias; and
- control the image forming unit to form an image under the image forming condition in which the development bias is corrected with the generated second correction bias.

3. The image forming apparatus according to claim 1, wherein the predetermined threshold is set based on a difference between a potential at which the photosensitive member is uniformly charged and the development bias.

4. The image forming apparatus according to claim 1, wherein:
- the image forming apparatus further comprises an environment sensor configured to detect an environmental condition, and
- the controller is configured to set the predetermined threshold based on the environmental condition detected by the environment sensor.

5. The image forming apparatus according to claim 4, wherein:

the environment sensor is configured to detect an ambient temperature and an ambient humidity, and the controller is configured to calculate an absolute moisture content based on the ambient temperature and the ambient humidity detected by the environment sensor to set a value of the predetermined threshold value based on the calculated absolute water content.

* * * * *